United States Patent [19]
Strolle et al.

[11] Patent Number: 5,619,154
[45] Date of Patent: Apr. 8, 1997

[54] NUMERICAL VOLTAGE CONTROLLED OSCILLATOR

[75] Inventors: Christopher H. Strolle, Glenside, Pa.; Steven T. Jaffe, Freehold, N.J.

[73] Assignee: David Sarnoff Research Center, Inc., Princeton, N.J.

[21] Appl. No.: 541,911

[22] Filed: Oct. 10, 1995

[51] Int. Cl.[6] ........................................ H03D 3/24
[52] U.S. Cl. .................... 327/129; 327/100; 327/105; 327/156; 327/158; 327/147; 327/149; 327/336; 327/146; 331/1 A; 364/721; 375/373
[58] Field of Search ........................ 327/100, 113, 327/116, 129, 105, 106, 147, 149, 150, 155, 156, 159, 334, 336, 339, 146; 364/721, 718; 375/373; 331/1 A

[56] References Cited

U.S. PATENT DOCUMENTS

| | | | |
|---|---|---|---|
| 4,191,932 | 3/1980 | Nagahama | 331/111 |
| 4,285,044 | 8/1981 | Thomas et al. | 364/721 |
| 4,494,080 | 1/1985 | Call | 331/8 |
| 4,507,617 | 3/1985 | Sasaki | 329/50 |
| 4,602,225 | 7/1986 | Miller et al. | 332/19 |
| 5,225,794 | 7/1993 | Shalka et al. | 331/178 |
| 5,517,535 | 5/1996 | Kroeger et al. | 327/146 |

*Primary Examiner*—Timothy P. Callahan
*Assistant Examiner*—Dinh T. Le
*Attorney, Agent, or Firm*—William J. Burke

[57] ABSTRACT

A numerical voltage controlled oscillator comprising an integrator for generating an estimated sine waveform and an estimated cosine waveform from a variable control signal; a normalizer, connected to the integrator, for generating a normalization factor from the estimated sine waveform and the estimated cosine waveform; and a multiplier, connected to the normalizer, for multiplying the normalization factor with the estimated sine waveform and the estimated cosine waveform. The multiplication of the estimated sine waveform and the normalization factor produces the sine waveform and the multiplication of the estimated cosine waveform and the normalization factor produces the cosine waveform. The frequency and phase of the sine and cosine waveforms vary with changes in amplitude of the variable control signal.

6 Claims, 2 Drawing Sheets

NUMERICAL VOLTAGE CONTROLLED OSCILLATOR

The invention relates to voltage controlled oscillators and more particularly, to numerical voltage controlled oscillators.

BACKGROUND OF THE DISCLOSURE

Modern digital communications systems require accurate and stable reference signals for use in modulation and demodulation of transmitted signals. For example, digital communications receivers typically contain a carrier recovery loop that is used to generate a carrier signal from the received transmission. FIG. 1 depicts a block diagram of an illustrative carrier recovery loop 100. Within the loop is a multiplier 102, a phase detector 104, a loop filter 106, and a voltage controlled oscillator (VCO) 108. The purpose of the carrier recovery loop is to lock the phase and frequency of the signals generated by the VCO (a carrier) to the received signal. To this end, the VCO generates a sinewave signal (carrier) that is typically phase locked to the received signal. In an M-ary, quadrature digital communications receiver, the VCO typically generates both a sine and a cosine waveform to phase lock to both I and Q-channel baseband (or near baseband) signals. In operation, the I and Q channel signals (on path 101) are phase detected in phase detector 104 to produce a phase error signal and loop filter 106 extracts the DC component of the phase error signal. The DC component is then applied to the VCO 108. The DC component adjusts the phase and/or frequency of the VCO to attain frequency lock with the received signal. The VCO generates both a cosine and sine waveform that are multiplied with the received signal at multiplier 102.

More specifically, the VCO comprises digital components including a modulo integrator 110 and at least one look-up table 112 and/or 114. The control signal of the VCO is an error voltage, e(t), typically generated by a low pass filtered signal from the phase detector 104. The DC level of the control signal is indicative of the phase error between the received signal and the VCO's signal. The modulo integrator includes an adder 116, a modulo function 118, and a one symbol delay 120. The input signals to the adder are the control signal and the output signal of the delay. The output of the adder forms the input to the modulo function and the output of the modulo function forms an input to the delay. This modulo integrator accumulates the control signal (error voltage) and "wraps" at some predefined overflow level of accumulation such that, when the control signal is a constant DC value, the integrator produces a sawtooth waveform at its output.

The instantaneous value of the output waveform of the integrator forms an input value (memory address) to one or more look-up tables 112, 114. Typically, in an M-ary receiver, there is a sine value look-up table 114 and a cosine value look-up table 112. Thus for each value of integrator waveform, the look-up tables generate a value of a sine function and a value of a cosine function. These values, when taken sequentially, form a sine waveform and a cosine waveform that are used by the receiver to demodulate the received transmission.

The size of the look-up tables, i.e., the number of values available to be referenced, is directly related to the desired precision of the sine and cosine waveforms. In other words, a very smooth waveform can only be generated if many, many values are available for recall from the tables. Generally, the look-up table technique for synthesizing waveforms is used for relatively simple digital communications systems, e.g., 4-ary or 16-ary quadrature amplitude modulation (QAM) techniques, where imprecise reference waveforms are sufficient. However, for modulation systems using 64-ary or 256-ary QAM, the reference waveforms generated by the VCO must be well-defined, precise and smooth. As such, the look-up tables can become excessively large and, as such, costly.

U.S. Pat. No. 4,285,044, issued Aug. 18, 1981, discloses an example of a numerical sinewave generator, i.e., a generator that does not utilize a look-up table. This generator uses a numerical technique to synthesize a sinewave given a constant phase value. Specifically, the generator has two input values, the cosine and sine of a constant phase angle, and synthesizes a sinewave of a fixed frequency and phase from the two input values. This patent is important for its disclosure of a numerical technique for synthesizing a sinewave; however, the generator lacks any capability of being voltage controlled. Thus, such a fixed frequency generator is not useful for modern digital communications systems.

Therefore, a need exists in the art for a numerical voltage controlled oscillator having an adjustable frequency and phase output signal and that does not use look-up tables to generate sine and cosine waveforms.

SUMMARY OF THE INVENTION

The disadvantages associated with prior art digital voltage controlled oscillators are overcome by the present invention of a numerical voltage controlled oscillator. The present invention generates a sine waveform, a cosine waveform, or both, using a numerical technique that does not utilize a look-up table to synthesize the waveform. Specifically, the invention comprises: an integrator for generating an estimated sine waveform and an estimated cosine waveform from a variable control signal; a normalizer, connected to the integrator, for generating a normalization factor from the estimated sine waveform and the estimated cosine waveform; and a multiplier, connected to the normalizer, for multiplying the normalization factor with the estimated sine waveform and the estimated cosine waveform. The multiplication of the estimated sine waveform and the normalization factor produces the sine waveform and the multiplication of the estimated cosine waveform and the normalization factor produces the cosine waveform. The frequency and phase of the sine and cosine waveforms vary with changes in amplitude of the variable control signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a numerical voltage controlled oscillator that generates a sine waveform, cosine waveform, or both using a numerical technique. Because there are no look-up tables to inherently limit the precision of the waveforms, the precision of the waveforms is limited only by the precision of the components used to implement the invention and the sampling frequency used to produce the digital signals. The phase and frequency of the output waveform is controlled by an input signal, e.g., error voltage e(t). In other words, the frequency of the output waveform ($S_o$) is a function of the error signal e(t) as defined by the following:

$$S_o = e^{j2\pi \int e(t)dt}$$

Figure 1:
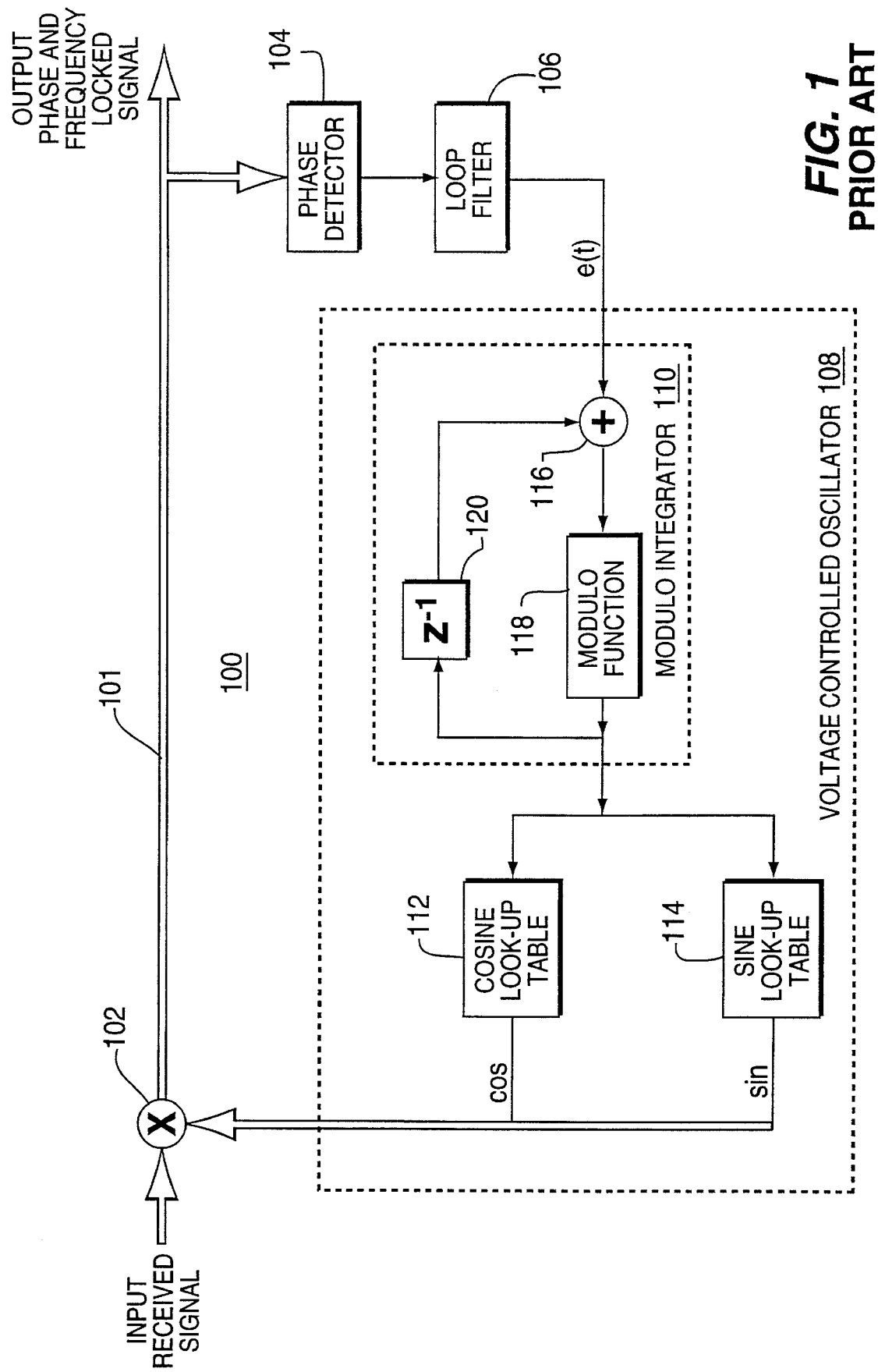
FIG. 1 depicts a block diagram of a conventional carrier recovery loop using a prior art digital voltage controlled oscillator.
Figure 2:
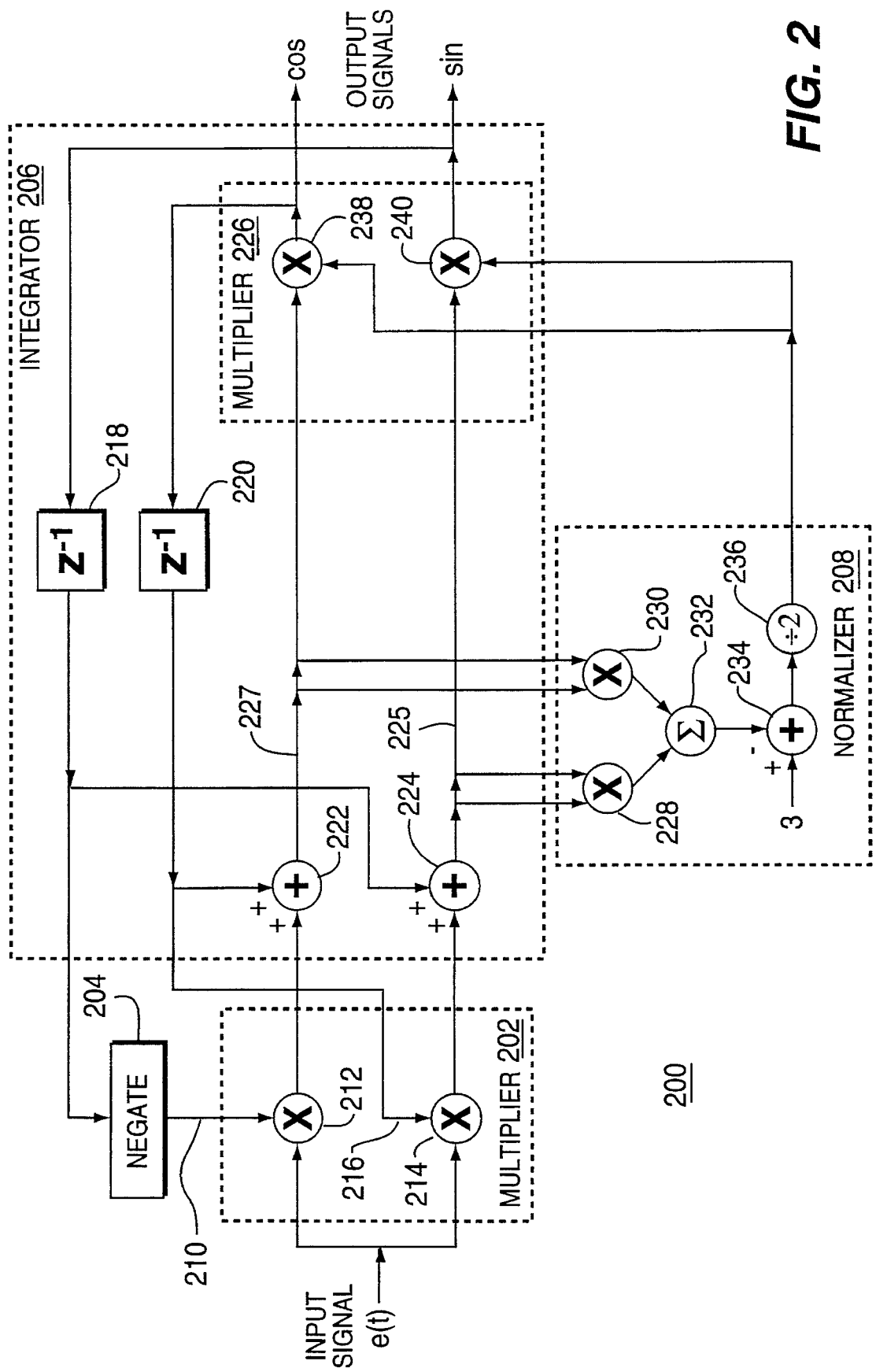
FIG. 2 depicts a block diagram of a numerical voltage controlled oscillator in accordance with the present invention.

FIG. 2 depicts a block diagram of a numerical voltage controlled oscillator (NVCO) 200 in accordance with the invention. The NVCO contains a multiplier 202, an integrator 206, and a normalizer 208. The multiplier 202 is connected to the integrator 206 in such a way that an input signal (e.g., an error voltage from a loop filter) is multiplied by an integrated signal and an negated integrated signal. The negated integrated signal is an integrated signal that has been multiplied by a negative one (−1) in block 204. More specifically, a negated sine integrated signal, on path 210, is multiplied, in multiplier 212, with the input signal. Similarly, an integrated cosine signal, on path 216, is multiplied, in multiplier 214, with the input signal. Those multiplied signals are sent back to the integrator 206.

The integrator 206 accumulates the sine and cosine signals by delaying, in respective one symbol delays 218 and 220, and summing, in respective adders 222 and 224, the delayed signals with non-delayed signals. As such, the combination of delay 218 and adder 224 forms a sine signal integrator and the combination of delay 220 and adder 222 forms a cosine signal integrator. The integrator is initialized by loading delay 218 with zero and delay 220 with a one, i.e., the NVCO has an initial state of cosine output equal to one and sine output equal to zero.

To ensure that the output cosine and sine signal waveforms remain on the unit circle, each integrated signal (i.e., estimated sine and cosine waveforms on paths 225 and 227) is processed in the normalizer 208 and then multiplied, in multiplier 226 by a normalization factor. The normalization factor is, in essence, a predictive estimate of error in the synthesized (estimated) waveforms. If the estimated cosine signal at one input to the multiplier 238 is A', and the estimated sine signal at one input of the multiplier 240 is B', then, due to processing and truncation errors, the output waveform would conform to the following identity: $A'^2 + B'^2 = 1+\epsilon$, where $\epsilon \neq 0$, and may be a positive or negative error value. It follows that, in order to obtain A and B such that they are components of a sinewave having unit amplitude, $$A^2 + B^2 = 1$$

$$A = A' \cdot 1/\sqrt{1+\epsilon}$$

$$B = B' \cdot 1/\sqrt{1+\epsilon}$$

To simplify the numerical computation of the normalization factor $1/\sqrt{1+\epsilon}$, the normalization factor is represented by the first coefficient of a Taylor series expansion thereof. Those skilled in the art should realize that additional coefficients can be used and also that other series expansions are also appropriate. Moreover, it is contemplated that a non-linear function could be used to generate the normalization factor.

By multiplying the estimated component values of the sine and cosine waveforms with the normalization factor, the component values are assured to maintain the output waveform on the unit circle. As such, the output waveforms remains stable.

Specifically, the estimated sine signal is squared (e.g., multiplied with itself in multiplier 228) and the estimated cosine waveform is squared (e.g., multiplied with itself in multiplier 230). The squared signals are added to one another in summer 232 to produce an instantaneous complex power value. The summer output is subtracted, in adder 234, from a constant, 3, and then divided, in divider 236, by a constant, 2. As such, the instantaneous complex power value (for simplicity, X, that is generated by the summer 232) is subtracted from 3 and divided by 2 or (3− X)/2. This represents the first coefficient of a Taylor series expansion of the function $1/\sqrt{X}$. This value forms the normalization factor that is multiplied, in respective multipliers 238 and 240, with the estimated sine and cosine signals. This normalization factor causes the numerical VCO to be self regulating and stable. The output signals from the VCO are cosine and sine signal waveforms that are adjustable in phase and frequency in response to the amplitude of the input signal, e.g., an error signal from a carrier recovery loop.

The numerical VCO of the invention generates both a sine and a cosine waveform. Some applications of the VCO may only require a sine waveform, or vice versa. As such, the cosine waveform is generated for internal use by the VCO while the output signal is the sine waveform only.

The foregoing embodiment of the invention was discussed as plurality of components generally a portion of an application specific integrated circuit (ASIC). Those skilled in the art should realize that the embodiment can be implemented as a software method as well as the hardware shown. In such an implementation, the function of each block in FIG. 2 becomes an executable routine for a computer system or other processing unit.

Although one embodiment which incorporates the teachings of the present invention has been shown and described in detail herein, those skilled in the art can readily devise many other varied embodiments that still incorporate these teachings.

What is claimed is:

1. A numerical voltage controlled oscillator for synthesizing a sine waveform having frequency and phase values in response to a variable control signal, where the frequency and phase values of the sine waveform are controlled by said variable control signal, the numerical voltage controlled oscillator (VCO) comprising:

an integrator for generating an estimated sine waveform and an estimated cosine waveform from said variable control signal;

a normalizer, connected to said integrator, for generating a normalization factor from said estimated sine waveform and said estimated cosine waveform; and a multiplier, connected to said normalizer, for multiplying said normalization factor with said estimated sine waveform and said estimated cosine waveform, where said multiplication of said estimated sine waveform and said normalization factor produces said sine waveform; and multiplication of said estimated cosine waveform with said normalization factor produces a cosine waveform wherein, said integrator further comprises:

a first delay for delaying said sine waveform;.

a second delay for delaying said cosine waveform;

a first adder connected to said first delay, for adding said delayed sine waveform with a first integrator input signal to produce said estimated sine waveform; and a second adder connected to said second delay for adding said delayed cosine waveform with a second integrator input signal to produce said estimated cosine waveform.

2. The numerical VCO of claim 1 further comprising:

a negator for multiplying said delayed sine waveform by negative one to produce a negated delayed sine waveform;

a first input multiplier, connected to said negator, for multiplying said variable control signal with a negated delayed sine waveform to produce said second integrator input signal; and a second input multiplier, connected to said second delay, for multiplying said variable control signal with a delayed cosine waveform to produce said first integrator input signal.

3. A method of synthesizing a sine waveform comprising the steps of:

providing a variable control signal;

generating an estimated sine waveform and an estimated cosine waveform from said variable control signal;

generating a normalization factor from said estimated sine waveform and said estimated cosine waveform; and multiplying said normalization factor with said estimated sine waveform and said estimated cosine waveform, where said multiplication of said estimated sine waveform and said normalization factor produces said sine waveform and said multiplication of said estimated cosine waveform with said normalization factor produces a cosine waveform wherein, said step of generating said estimated sine and cosine waveforms further comprises the steps of:

delaying said sine waveform;

delaying said cosine waveform;

adding said delayed sine waveform with a first integrator input signal to produce said estimated sine waveform; and adding said delayed cosine waveform with a second integrator input signal to produce said estimated cosine waveform.

4. The method of claim 3 further comprising the steps of:

multiplying said delayed sine waveform by negative one to produce a negated delayed sine waveform;

multiplying said variable control signal with a negated delayed sine waveform to produce said second integrator input signal; and multiplying said variable control signal with a delayed cosine waveform to produce said first integrator input signal.

5. The method of claim 3 wherein said step of generating said normalization factor further comprises the steps of:

generating an instantaneous power value from said estimated sine and cosine waveforms; and producing, in response to said instantaneous power value said normalization factor.

6. The method of claim 3 wherein said normalization factor generating step generates a first coefficient of a Taylor series expansion as the normalization factor.

* * * * *